US007730470B2

(12) United States Patent
Sharapov et al.

(10) Patent No.: US 7,730,470 B2
(45) Date of Patent: Jun. 1, 2010

(54) BINARY CODE INSTRUMENTATION TO REDUCE EFFECTIVE MEMORY LATENCY

(75) Inventors: Ilya A. Sharapov, Palo Alto, CA (US); Andrew J. Over, Canberra (AU)

(73) Assignee: Oracle America, Inc., Redwood Shores, CA (US)

( * ) Notice: Subject to any disclaimer, the term of this patent is extended or adjusted under 35 U.S.C. 154(b) by 1131 days.

(21) Appl. No.: 11/362,979

(22) Filed: Feb. 27, 2006

(65) Prior Publication Data

US 2007/0226703 A1    Sep. 27, 2007

(51) Int. Cl.
*G06F 9/45* (2006.01)

(52) U.S. Cl. ........................ 717/151; 717/140; 717/141; 717/145; 717/155; 717/158; 717/161

(58) Field of Classification Search ......... 711/147–160; 717/136–141
See application file for complete search history.

(56) References Cited

U.S. PATENT DOCUMENTS

| | | | | | |
|---|---|---|---|---|---|
| 4,530,054 | A | * | 7/1985 | Hamstra et al. | 711/133 |
| 5,699,536 | A | * | 12/1997 | Hopkins et al. | 712/216 |
| 6,567,975 | B1 | * | 5/2003 | Damron | 717/155 |
| 6,675,374 | B2 | * | 1/2004 | Pieper et al. | 717/141 |
| 6,725,241 | B1 | * | 4/2004 | Rodriguez et al. | 707/203 |
| 6,901,581 | B1 | * | 5/2005 | Schneider | 717/124 |
| 6,959,363 | B2 | * | 10/2005 | Southwell et al. | 711/137 |
| 7,383,428 | B2 | * | 6/2008 | Bottemiller et al. | 712/227 |
| 7,487,297 | B2 | * | 2/2009 | El-Essawy et al. | 711/137 |
| 2004/0093591 | A1 | * | 5/2004 | Kalogeropulos et al. | 717/155 |
| 2005/0138329 | A1 | * | 6/2005 | Subramoney et al. | 712/207 |

OTHER PUBLICATIONS

Vasanth Bala, Evelyn Duesterwald and Sanjeev Banerjia; "Dynamo: A Transparent Dynamic Optimization System", Conference on Programming Language Design and Implementation; 2000, pp. 1-12, Vancouver, British Columbia, Canada.

Bob Cmelik and David Keppel; "Shade: A Fast Instruction-Set Simulator for Execution Profiling", Joint International Conference on Measurement and Modeling of Computer Systems; 1994, pp. 128-137, Nashville, Tennessee, U.S.A.

Jared Smolens and Chi Chen; "Sarastro: A Hot Data Stream Detection Mechanism for a Java Virtual Machine", Spring 2003, 5 pages, Computer Architecture Laboratory at Carnegie Mellon, Pittsburg, PA, U.S.A.

* cited by examiner

*Primary Examiner*—Wei Y Zhen
*Assistant Examiner*—Sao Lu
(74) *Attorney, Agent, or Firm*—Robert C Kowert; Meyertons, Hood, Kivlin, Kowert & Goetzel, P.C.

(57) ABSTRACT

A system for binary code instrumentation to reduce effective memory latency comprises a processor and memory coupled to the processor. The memory comprises program instructions executable by the processor to implement a code analyzer configured to analyze an instruction stream of compiled code executable at an execution engine to identify, for a given memory reference instruction in the stream that references data at a memory address calculated during an execution of the instruction stream, an earliest point in time during the execution at which sufficient data is available at the execution engine to calculate the memory address. The code analyzer generates an indication of whether the given memory reference instruction is suitable for a prefetch operation based on a difference in time between the earliest point in time and a time at which the given memory reference instruction is executed during the execution.

17 Claims, 8 Drawing Sheets

BINARY CODE INSTRUMENTATION TO REDUCE EFFECTIVE MEMORY LATENCY

The U.S. Government has a paid-up license in this invention and the right in limited circumstances to require the patent owner to license others on reasonable terms as provided for by the terms of Contract No. NBCH3039002 warded by the Defense Advanced Research Projects Agency (DARPA).

BACKGROUND OF THE INVENTION

1. Field of the Invention

The present invention is directed to computer systems. More particularly, it is directed to techniques to reduce latency of memory access operations within instruction streams executed at computer processors.

2. Description of the Related Art

Microprocessor speeds have been increasing dramatically as the underlying semiconductor technology has advanced. Central processing units used in single-user workstations and even in laptops today are often, at least in terms of clock rates, several times faster than the fastest processors in use just a few years ago. However, changes in processor clock rates do not always result in similar relative improvements in application performance as perceived by end users. A number of factors may affect overall application performance in addition to processor clock rates, among which one of the more important factors may be latency to memory: that is, the time it may take to transfer data and instructions between the memory hierarchy and the processor at which the instructions manipulating the data are executed. Improvements in memory access times have in general not kept pace with improvements in processor speeds. If processors frequently have to wait for data or instructions to be received from memory, many processor cycles may be wasted instead of being used for doing "useful" work, thus reducing the impact of faster clock rates on application performance.

A variety of techniques have been developed in attempts to address the mismatch between memory latency and processor speeds. For example, a number of hierarchical cache architectures have been developed to store frequently accessed data and instructions closer to the processors than main memory. However, cache implementations usually involve tradeoffs between cache size and proximity to the processors; it may not always be feasible to implement large enough caches sufficiently close (in terms of access latency) to the processors to overcome the memory latency problems. In many processor architectures, for example, relatively small and fast Level-1 (L1) caches may be employed, together with larger but not as fast Level-2 (L2) caches. Lookups for data and/or instructions may be performed hierarchically. First, the L1 cache may be examined; if the data/instructions are not found in the L1 cache, the L2 cache may be examined; and if the data/instructions are not found in the L2 cache, the data/instructions may be fetched from main memory. More than two layers of caches may be implemented in some processor architectures. While accesses to L1 caches may be fast (e.g., a few processor cycles), the latency to the L2 caches may still be sufficiently large with respect to processor clock rate (e.g., tens or hundreds of processor cycles) that for many applications, the cache latency (as well as the latency to main memory) may still have a significant impact on overall application throughput.

In another complementary approach to the memory latency problem, some processor architectures may support prefetch instructions that allow data to be fetched from memory prior to the time that it may be needed, thus masking at least some of the effects of long memory access times. Such prefetch instructions may typically be inserted into applications at code generation time (e.g., at compile time). However, determining exactly which memory reference candidates are the best candidates for prefetch may be hard, especially when only binary or compiled versions of the application code are available for instrumentation. In addition, when more than one technique for inserting prefetch instructions into program code may be available, it may be difficult to determine the relative efficiency of the various techniques.

SUMMARY

Various embodiments of systems and methods for binary code instrumentation to reduce effective memory latency are disclosed. According to one embodiment, a system comprises a processor and memory coupled to the processor, where the memory comprises program instructions executable by the processor to implement a code analyzer. The code analyzer may be configured to analyze an instruction stream of compiled code executable at an execution engine to identify, for a given memory reference instruction in the stream that references data at a memory address calculated during an execution of the instruction stream, an earliest point in time during the execution at which sufficient data is available at the execution engine to calculate the memory address. The code analyzer may be further configured to generate an indication of whether the given memory reference instruction is suitable for a prefetch operation based on a difference in time between the earliest point in time and a time at which the given memory reference instruction is executed during the execution. The code analyzer may perform the analysis either dynamically or statically on compiled code, without, for example, requiring access to source code. The execution engine may comprise, in various embodiments, a hardware processor, or a simulation/emulation of a hardware processor. The difference in time may be referred to herein as a "potential prefetch window", since it may indicate a time period during which a prefetch instruction could have been issued for the memory reference instruction.

In some embodiments, each instruction in the instruction stream may have an associated implicit or explicit timestamp (e.g., an instruction sequence number or processor cycle counter value), and the potential prefetch window may be expressed in the units in which the timestamp is expressed. For example, in one embodiment where an instruction sequence number is used as an instruction timestamp, the code analyzer may be configured to calculate, as part of the analysis, that the address of an operand for the memory reference instruction "MRI1" could have been generated 50 instructions prior to the execution of MRI1. The code analyzer may send, e.g., to a code generator, an indication that MRI1 may be a suitable candidate for a prefetch, and the code generator may use the indication that the prefetch window is 50 instructions to determine an appropriate location within the executable code (e.g., at some location within the 50 instruction prefetch window prior to the memory reference instruction) at which to insert a prefetch instruction for MRI1. In some embodiments, the code analyzer may be configured to determine the appropriate location at which a prefetch instruction should be inserted, while in other embodiments, an entity other than the code analyzer (such as a code generator) may be configured to determine the appropriate location, e.g., based at least in part on the information provided by the code analyzer.

In some embodiments, operand addresses for memory references may be computed at least in part based on the contents of a set of registers of the execution engine. In such embodiments the code analyzer may be configured to maintain a respective register timestamp for each register that may be used for address generation. When an instruction that modifies contents of a register is executed during the instruction stream, the code analyzer may be configured to update the register timestamp for the modified register to indicate the earliest point in time (e.g., expressed in the same units as instruction timestamps) at which the value could have been computed during the execution of the instruction stream. For each memory reference instruction whose address is generated using one or more registers, the code analyzer may identify the registers used, and determine the earliest time at which the address could have been generated as the maximum among the register timestamp values of the registers used. For example, if the operand address for memory reference instruction MRI1 is calculated using registers R1 and R2, the earliest time at which the address could have been generated may be computed as the higher register timestamp value among the register timestamp values for R1 and R2 at the time that MRI1 is executed.

In updating the register timestamp values, in some embodiments the code analyzer may be configured to select the updated value based on the specific type of register modification or the source from which the modified register value is obtained. For example, in one embodiment, if the register modifying instruction stores a constant into the register (e.g., a value obtained from a constant register or a value defined as a constant within the application corresponding to the execution stream), the register timestamp may be set to zero. If the register modifying instruction loads a data value from a memory location into the register, the register timestamp may be set to the instruction timestamp of the register modifying instruction. If the register modifying instruction stores a result of an arithmetic or logical operation into the register, where the operands of the arithmetic or logical operation were located in one or more other registers, the register timestamp may be set to the maximum register timestamps among the register timestamps of the one or more other registers; and if the register modifying instruction is a conditional move instruction using a condition code register, the register timestamp may be set to the register timestamp of the condition code register.

In one embodiment, the code analyzer may be further configured to select, as the instruction stream, a portion of the compiled executable version of an application program to be optimized for performance. For example, the code analyzer may, in conjunction with or as part of a Just In Time (JIT) compiler at a Java™ virtual machine (JVM), select a frequently executed code portion of an application for optimization. The code analyzer may be configured to dynamically insert instrumentation code into the selected instruction stream to identify potential prefetch opportunities. During a subsequent run of the instrumented code, the code analyzer may gather instrumentation data output by the instrumentation code, and use the instrumentation data to insert prefetch instructions into the code to be optimized. The instrumentation code may be removed from the instruction stream in some implementations after the instrumentation data has been gathered. During future re-executions of the instructions corresponding to the instruction stream, the prefetch instructions may help to reduce the effective memory latency, e.g., by overlapping memory accesses with other operations and preventing processor stalls. In some embodiments, the code analyzer may be used to analyze the effectiveness of an existing prefetch instruction insertion mechanism, e.g., by comparing the number of potential prefetch opportunities that exist for a given instruction stream to the actual number of prefetch instructions inserted by the mechanism.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
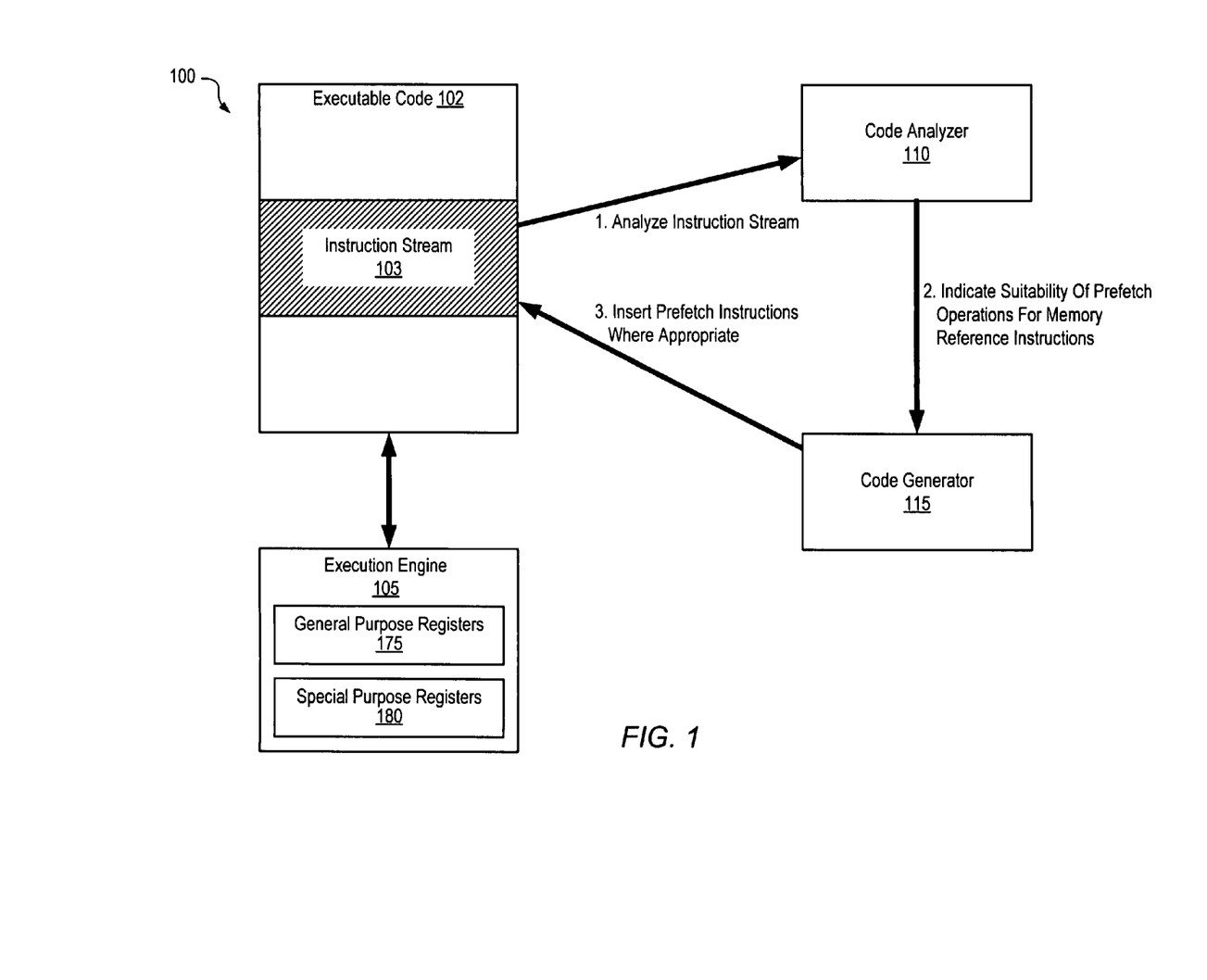
FIG. 1 is a block diagram illustrating one embodiment of a system.

FIG. 1 is a block diagram illustrating one embodiment of a system 100. The system includes an execution engine 105, compiled executable code 102 targeted for execution at the execution engine, a code analyzer 110 and a code generator 115. In various embodiments, the execution engine 105 may comprise a hardware processor, a simulator of a processor or computer system, or an emulator of a processor or system. The executable code 102 may comprise the instructions for one or more applications and/or the instructions for infrastructure software such as an operating system, an application server or other middleware, etc. The code analyzer 110 may be configured to analyze at least a subset of the executable code 102 (as indicated by the arrow labeled "1" in FIG. 1), which may be termed an instruction stream 103 herein, for potential opportunities for prefetch operations, as described below in further detail. In one embodiment, for example, the execution engine may include a set of registers, including general-purpose registers 175 and/or special purpose registers 180, which may be used to perform various calculations including address generation for memory references. In such an embodiment, the code analyzer may be configured to identify potential prefetch opportunities by determining, for each register-modifying instruction in the instruction stream 103, how early in the execution of the stream the modified data in the register could have been calculated, and using this information to deduce how early the addresses of memory reference instruction operands could have been generated. The analysis of the executable code may be performed without having access to the source code from which the executable code was derived in some embodiments. The analysis may be static (e.g., using an instruction trace or a disassembled version of the executable code 102) in some embodiments, and dynamic (e.g., using binary recompilation, a Just-In-Time or JIT compiler, or an instrumentation tool) in other embodiments. The executable code may 102 may be instrumented (e.g., instrumentation instructions may be added to the code and the instrumented code may then be re-run) in some embodiments to aid in the analysis. Further details about the various elements of system 100 and the types of operations performed during instrumentation and analysis, such as maintenance of timestamps for various registers of the execution engine, are provided below.

The term "instruction stream", as used herein, refers to a sequence of instructions executed as part of a single thread of execution within the execution engine during at least one execution of the executable code 102. The execution engine 105 may be capable of multiple concurrent threads of execution in some embodiments (e.g., the execution engine may comprise a multi-threaded or multi-core processor, a multi-processor system, or a simulation or emulation of such a processor or system). The code analyzer 110 and the code generator 115 may each be executed on the execution engine 105 in some embodiments, and at a processor or processors other than the execution engine 105 in other embodiments. In one embodiment, a particular subset of the executable code 102 may be selected as the instruction stream 103 to be analyzed, based on one or more factors such as the degree to which the particular subset of code is likely to be re-executed.

The instruction stream 103 may comprise a plurality of memory reference instructions, where the addresses of at least some of the operands of the memory reference instructions may be computed during the execution of the instruction stream. As part of the analysis of the instruction stream, the code analyzer may be configured to identify, for each of one or more memory reference instructions, an earliest point in time during the execution of the stream at which sufficient data is available at the execution engine to calculate the address of an operand of the corresponding memory reference instruction. For example, in some embodiments, each of the instructions in the stream 103 may have an associated implicit or explicit instruction timestamp. The instruction timestamp may indicate a time, relative to the start of the execution of the instruction stream 103, at which the instruction was executed, and the earliest possible time at which an operand address could have been calculated may be expressed in the same units as the timestamp. In some embodiments, a sequence number may be associated with each instruction of an instruction stream 103 as shown below, and the sequence number for an instruction may serve as an implicit instruction timestamp:

| Sequence Number | Instruction |
|---|---|
| 1 | load(regA, 5) |
| 2 | store(regB, regC+regA) |
| 3 | left_shift(regB, 2) |
| ... | |

In other embodiments, other types of timestamps may be utilized for the instructions of the stream 103, such as a processor cycle counter value for each instruction.

Having computed the earliest point in time at which an operand address could have been calculated for each of the memory references, the code analyzer 110 may be configured to generate an indication of a suitability of prefetch operations for the memory reference instructions. For example, if the code analyzer 110 determines that the address for a memory reference instruction MRI1 could have been calculated 100 processor cycles prior to the execution of MRI1, and the average latency of accessing data from memory in the processor of execution engine 105 is 50 cycles, then MRI1 may be deemed a suitable candidate for a prefetch operation, since it may be possible to obtain the operand data from memory before MRI1 executes, potentially avoiding a delay corresponding to a memory access. If the code analyzer 110 determines that, for the same execution engine, the address for a memory reference instruction MRI2 could have been calculated no earlier than 10 processor cycles prior to the execution of MRI2, MRI2 may not be considered a good candidate for a prefetch operation (since a prefetch operation initiated as early as possible, i.e., 10 processor cycles before MRI2 is executed, may not be able to retrieve the operand data prior to MRI2's execution). Thus, the suitability of a memory reference instruction may depend in part on the architecture and/or implementation-specific details of the processor on which the instruction is to be executed (or the processor being simulated/emulated) in some embodiments. Threshold values such as average memory latency, average latency for cache accesses, etc., that may be used to determine suitability of memory reference operations for prefetches may be provided to code analyzer 110 as configurable input parameters in some embodiments. In such embodiments, the code analyzer 110 may be configured to use the threshold values in generating the indications of suitability of prefetch operations for various memory reference instructions.

As indicated by the arrow labeled "2" in FIG. 1, in some embodiments the indication of suitability for prefetch may be transmitted to a code generator 115. In response to the information provided by the code analyzer 110, the code generator 115 may in turn be configured to insert one or more prefetch instructions into the executable code 102 (as indicated by the arrow labeled "3" in FIG. 1). For example, in one embodiment, the code analyzer 110 may provide, in the indication provided to the code generator, a measure of the difference between the earliest time at which an operand address could have been generated for a particular memory reference instruction and the time at which the instruction was executed (e.g. "the address for instruction MRI1 could have been generated 20 instructions before MRI1"). Using the measure of the difference in time, code generator 115 may identify an appropriate location in the executable code at which to insert a prefetch instruction for the memory reference instruction (e.g., the prefetch instruction could be inserted 18 or 15 instructions before MRI1 in the example where the address could have been generated 20 instructions before MRI1's execution). Alternatively, the code generator 115 may determine, based on the information provided by the code analyzer, that a particular memory reference is not a good candidate for a prefetch operation, and may not insert a prefetch instruction for the memory reference instruction. In addition, in some embodiments the code generator 115 may also determine that even though a particular memory reference instruction is a good candidate for a prefetch operation based on the information provided by the code analyzer, no prefetch instruction should be inserted for the particular memory reference instruction, e.g., based on any of a variety of factors such as limitations on the number of prefetch operations outstanding, etc. Various prefetch instructions may be supported in different processor architectures, such as the prefetch instruction included in the SPARC™ V9 instruction set architecture from Sun Microsystems, and prefetch instructions in various versions of Pentium™ processor architecture from Intel Corporation. A prefetch instruction may be handled by an execution engine 105 much like a load instruction, with some differences: e.g., the data may only be loaded into an L2 cache in some implementations, so as not to overwrite data in a smaller L1 cache, etc. In some embodiments, as described below in conjunction with the description of FIG. 3, the analysis provided by the code generator may be used for purposes other than insertion of prefetch instructions into executable code; e.g., the analysis may be used to compare the effectiveness of different existing prefetch instruction generation mechanisms.

In some embodiments, the code analyzer may be configured to simply list the memory reference instructions for which it has performed the analysis, and a corresponding earliest timestamp at which the address of an operand of the memory reference instruction may be computed, and the determination of whether a given memory reference instruction is a good candidate for prefetch may be made outside the code analyzer. In other embodiments, the code analyzer may also provide a measure of the difference (e.g., in instruction timestamp units or in units of processor cycles) between the earliest time at which an operand address could have been calculated and the execution time of the instruction, without necessarily determining whether the difference is sufficient to justify a prefetch operation. In some execution engines 105, the time at which an instruction is issued for execution may differ from the time at which the instruction is actually executed. For such execution engines, the instruction issue time and/or potential delays between instruction issuance and execution may be taken into consideration when determining the suitability of a memory reference instruction for a prefetch operation.

It is noted that the instructions that form an instruction stream 103 may not always be executed in the same order in some embodiments; for example, in some processor implementations supporting out-of-order execution and/or branch predictions, instructions may be executed in one sequence during one execution of the code, and in another, slightly different order during a second execution of the same compiled code. It is noted that even if the instructions are executed out of order in some implementations, the instructions would still be retired in order; thus, while it may be possible for memory requests to be visible out of order to an external entity in such implementations, instrumentation code on the processor itself would observe the instruction stream strictly in order. In some embodiments the executable code 102 may nevertheless be run several times, e.g., to obtain a representative sample set of timing information such as cache miss times of interest for prefetch analysis.

Figure 2:
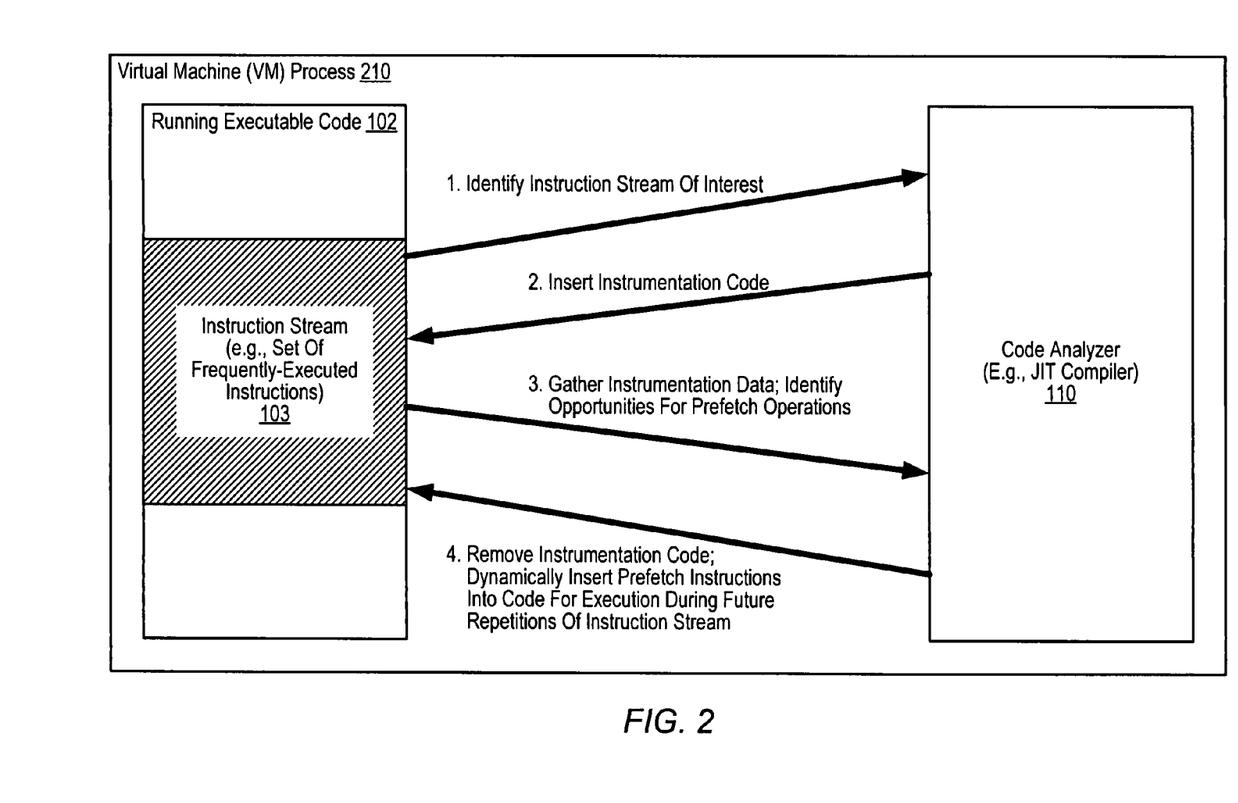
FIG. 2 is a block diagram of an embodiment in which a code analyzer is included within a virtual machine process.

FIG. 2 is a block diagram of an embodiment in which the code analyzer 110 is included within a virtual machine (VM) process 210 at which the executable code 102 runs. The VM 210 may, for example, provide an execution environment for applications written in a platform-independent programming language such as Java™ and compiled into byte code prior to execution. Some VMs, such as many recent versions of Java™ Virtual Machines (JVMs) from Sun Microsystems including the HotSpot™ JVM, may be capable of identifying specific portions of application byte code that are to be optimized for performance, e.g., by compiling the byte code into native code for the underlying hardware processor architecture for faster execution. The specific portions of the application may be selected for optimization based on a variety of factors, such as relatively frequent re-execution, ease of compilation into native code, etc., in various embodiments. In some embodiments, code that is selected for native compilation may also be analyzed for potential prefetch opportunities.

As indicated by the arrow labeled "1" in FIG. 2, code analyzer 110 (which may, for example, be part of a Just In Time or JIT compiler in VM 210) may be configured to identify an instruction stream that is to be analyzed for prefetch opportunities from a running application 102. It is noted that in some embodiments, not all the portions of the code that may be selected for optimization by an optimizing VM 210 or JIT compiler may be analyzed for prefetch possibilities, and not all instruction streams analyzed for prefetch possibilities may correspond to portions of the code that may be selected for optimization by an optimizing VM 210 or JIT compiler. Having identified the instruction stream 103, the code analyzer may insert instrumentation instructions into the code corresponding to the instruction stream, as indicated by the arrow labeled "2" in FIG. 2. The instrumentation instructions may provide data that may be used to calculate the earliest times at which operand addresses could have been calculated, e.g., by providing for each register-modifying instruction a register timestamp that identifies when the contents of the register could have been generated, as described below in further detail. When the code corresponding to the instruction stream 103 is run at some time in the future within the virtual machine 220, output from the instrumentation instructions may be gathered by the code analyzer 110 (as indicated by the arrow labeled "3"). Using the data generated by the instrumentation instructions, the code analyzer 110 may identify memory reference instructions that are suitable candidates for prefetch. The code analyzer may in some embodiments be configured to remove the instrumentation instructions from the executable code after the instrumentation output has been generated, and dynamically insert prefetch instructions at appropriate locations within the running executable code 102 (as indicated by the arrow labeled "4"). During subsequent executions, the prefetch instructions may help to reduce the time taken for execution of the code 102, e.g., by avoiding processor stalls that might otherwise have occurred when the operands of the memory reference instructions were retrieved from memory, L2 or L3 caches, etc.

Figure 3:
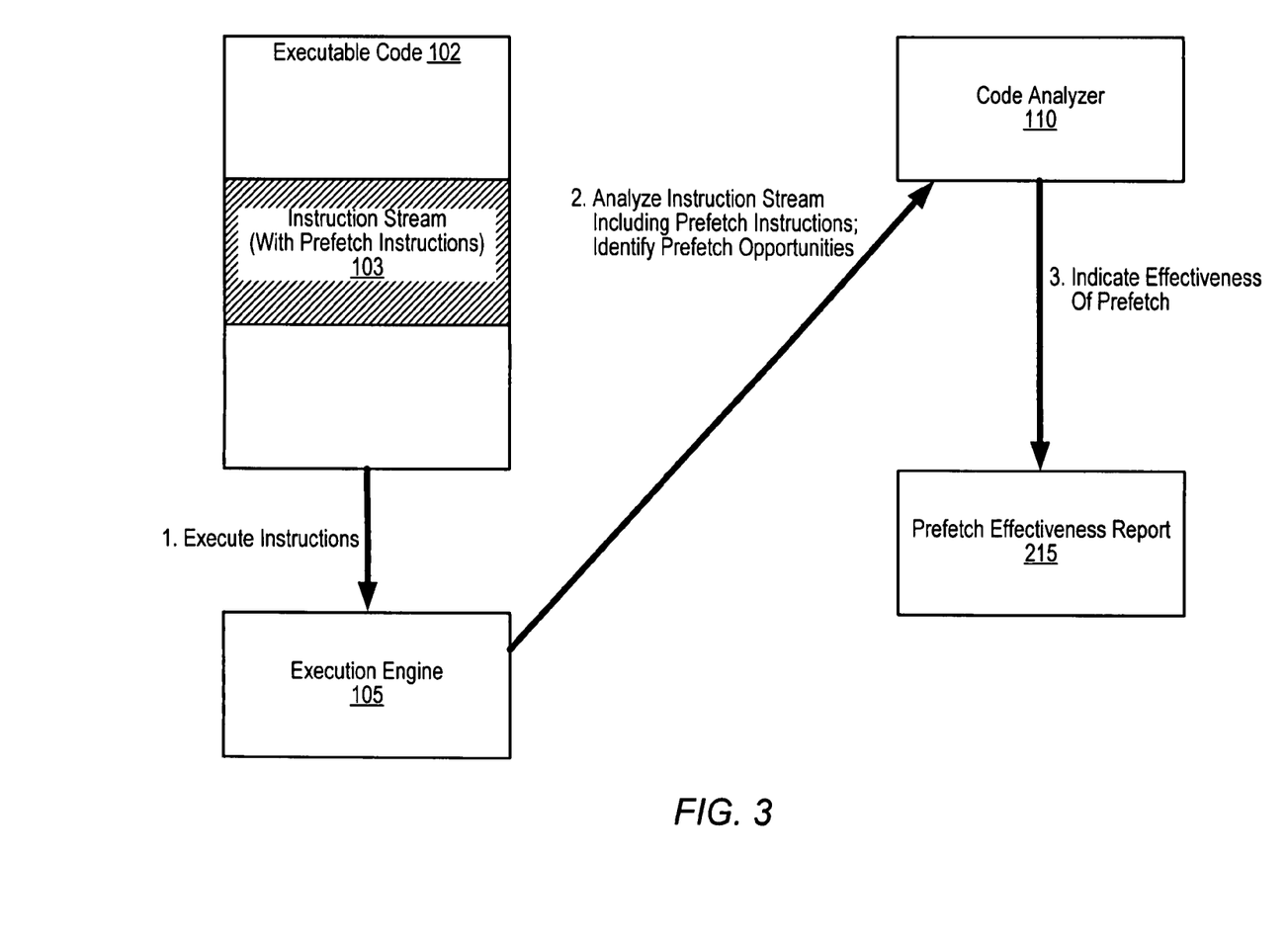
FIG. 3 is a block diagram illustrating an embodiment in which a code analyzer is configured to analyze executable code that already includes prefetch instructions

In some embodiments, one or more mechanisms for generating prefetch instructions or operations may already be in use at the execution engine 105, and the code analyzer 110 may be used to estimate the effectiveness of the mechanisms, e.g., by comparing what the existing prefetch mechanisms actually accomplish with memory latency reductions that could potentially be achieved. FIG. 3 is a block diagram illustrating an embodiment in which code analyzer 110 is configured to analyze executable code 102 that already includes prefetch instructions. The executable code 102, including the instruction stream 102 comprising one or more prefetch instructions, may be run on an execution engine 105, as indicated by the arrow labeled "1" in FIG. 3. In some embodiments, the code may comprise instrumentation instructions, and the code analyzer 110 may be configured to gather the output of the instrumentation instructions to analyze the instruction stream for additional potential prefetch opportunities (as illustrated by the arrow labeled "2"). In other embodiments, the execution engine 105 may comprise a simulation or an emulation of a processor or computer system, or a component of an instrumentation tool, and functionality within the simulator/emulator or instrumentation tool may gather the information needed for the analysis, e.g., without inserting additional instructions into the executable code 102. The analysis of the instruction stream may include comparing a set of potential prefetch opportunities with the actual prefetch operations performed (e.g., by comparing the number of memory reference instructions for which prefetch operations could potentially have been inserted with the actual number of memory reference instructions for which prefetch instructions were inserted, and/or by comparing positions within the executable code at which prefetch instructions could potentially have been inserted with positions at which prefetch instructions were actually inserted). After analyzing the instruction stream, in some embodiments the code analyzer 105 may be configured to generate a report on the effectiveness of the prefetch mechanism, as indicated by the arrow labeled "3". In one embodiment, for example, the code analyzer may include summary information in the prefetch effectiveness report, indicating the percentage or fraction of possible prefetch operations that were actually performed by the prefetch mechanism, as well as the specific prefetch opportunities that were missed, as shown below:

Prefetch Effectiveness Report
Configuration: Processor X, Application Y, Instruction Stream Z . . .
Length Of Analyzed Instruction Stream: 101308 Instructions
Potential Prefetch Opportunities Identified: 3505
Actual Prefetches Performed: 2703 (77.1%)
Details Of Prefetch Opportunities:
. . .

In the illustrated example, the prefetch effectiveness report indicates that for 77.1% of the potential prefetch opportunities identified by the code analyzer, the prefetch mechanism in use actually performed prefetch operations. The section on "Details Of Prefetch Opportunities" may list all the prefetch opportunities identified during the analysis in some embodiments, and only the missed prefetch opportunities in other embodiments. In some embodiments, the code analyzer 110 may be configured to provide a more sophisticated analysis than a straightforward comparison of the number of potential and actual prefetch operations. For example, the code analyzer 110 may quantify the memory latency savings, e.g., in terms of processor cycles, for each prefetch operation, or the average cycles per instruction (CPI) achievable and achieved for the execution of the instruction stream, etc. In other embodiments, the code analyzer may be configured to provide raw data related to prefetch operations (e.g., an indication of the potential prefetch opportunities it found, and the actual prefetch operations executed during the execution of the instruction stream), and the determination of the effectiveness of the prefetch mechanism may be performed elsewhere. In one embodiment where the instruction stream is analyzed using a simulator or an emulator, the potential savings of prefetch operations may be compared for a variety of parameters (such as different cache and memory latencies, different cache sizes, etc.), e.g., in order to help design future processor implementations. The code analyzer 110 may be used to compare the effectiveness of a plurality of different actual or simulated prefetch mechanisms for the same instruction stream 103 in some embodiments.

Figure 4:
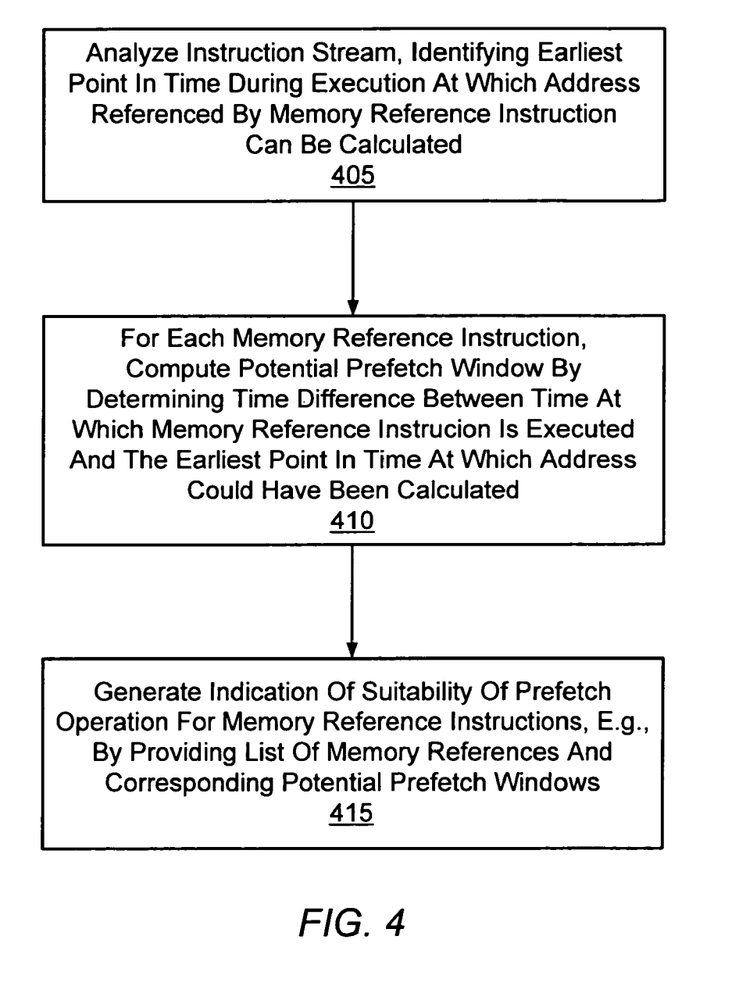
FIG. 4 is a flow diagram illustrating aspects of the operation of a code analyzer according to one embodiment

FIG. 4 is a flow diagram illustrating aspects of the operation of a code analyzer 110 according to one embodiment. As part of its analysis of an instruction stream 103 of compiled code 102, the code analyzer may be configured to identify, for each of one or more memory reference instructions, the earliest time during the execution stream at which enough data is available at the execution engine to generate or calculate the address of an operand referenced by the instruction (block 405). The instruction stream 103 may be obtained from a trace of a run of an instrumented program in some embodiments. In other embodiments the instruction stream may be dynamically observed during program execution, e.g., within a virtual machine process. The instruction stream may comprise a portion of a thread of execution with a multiprocessor system, or a multi-core processor in some embodiments. For each memory reference instruction, the code analyzer may be configured in some embodiments to compute the difference between the time at which the instruction is executed and the earliest time at which the operand address could have been generated (block 410). This difference may be termed a "potential prefetch window" herein. The code analyzer may be configured to use the computed potential prefetch windows to generate an indication of a suitability of one or more of the memory reference instructions for prefetch operations (block 415), e.g., by providing a list of the memory reference instructions and the corresponding potential prefetch windows.

Figure 5:
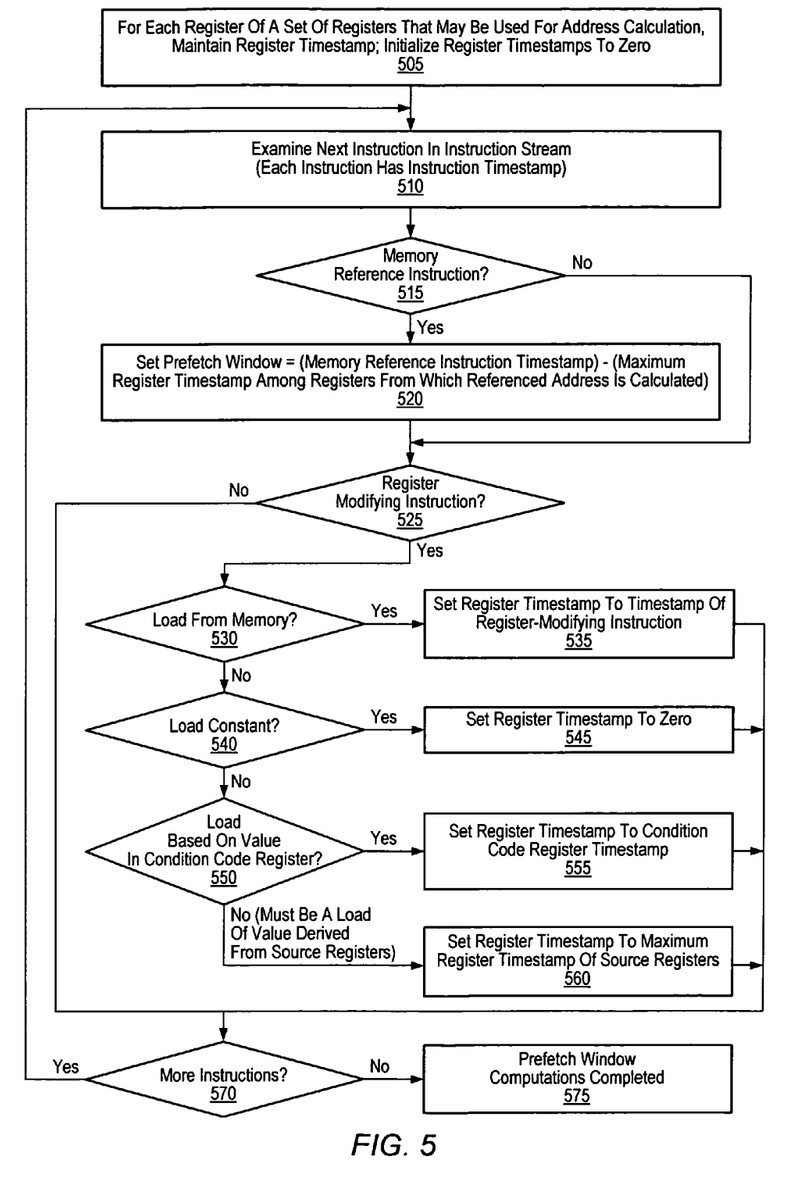
FIG. 5 is a flow diagram illustrating aspects of the operation of a code analyzer configured to determine, for each register-modifying instruction in an instruction stream, when during the execution of the stream the modified data in the register could have been calculated earliest, according to one embodiment.

The addresses referenced by the memory reference instructions may be generated within the execution engine using various registers, including various general-purpose registers (GPRs) 175 (shown in FIG. 1) and/or special purpose registers 180 in some embodiments. FIG. 5 is a flow diagram illustrating aspects of the operation of a code analyzer 110 configured to determine, for each register-modifying instruction in the instruction stream 103, when during the execution of the stream the modified data in the register could have been calculated earliest, and to use this information to deduce how early the addresses of memory reference instruction operands could have been generated, according to one embodiment. As shown in block 505 of FIG. 5, the code analyzer may be configured to maintain a register timestamp for each register of execution engine 105 that may be used for address generation. At any given point of time during the execution, the register timestamp may represent the earliest time during the execution at which the current value in the register could have been calculated. Each instruction in the instruction stream may have an associated instruction timestamp, e.g., an instruction sequence, instruction count, or a processor cycle count, and the register timestamps may be expressed in the same units as the instruction timestamps. Initially (i.e., when the analysis is begun), all register timestamps may be set to zero. The code analyzer 110 may be configured to examine, in turn, each instruction of the instruction stream 103 to compute potential prefetch windows (for memory reference instruction) and update the register timestamps (for register-modifying instructions) according to the following methodology.

If the next instruction examined (block 510) is a memory reference instruction such as a load or store instruction (as detected in block 515), and if the address of the data is computed using one or more of the registers for which register timestamps are maintained, the potential prefetch window for the memory reference instruction may be determined as shown in block 520, and may for example be recorded in a data structure maintained by code analyzer 110 along with an identification of the memory reference instruction itself. The potential prefetch window may be calculated in the depicted embodiment by subtracting, from the instruction timestamp for the memory reference instruction, the maximum of the register timestamp values for those registers that are used in determining the address referenced by the instruction. For example, if an address referenced by a memory reference instruction MRI1 with an instruction timestamp ITS1 is calculated by adding values stored in registers R1 and R2, and R1 and R2 have respective register timestamps RTS1 and RTS2, then the potential prefetch window for MRI1 may be calculated as (ITS1—maximum(RTS1,RTS2)). This calculation indicates that, based on the information available to code analyzer 110 from the instruction stream, the address of memory operand of MRI1 could have been computed no earlier than the point in time when the values in both R1 and R2 could both have been calculated. It is noted that in some embodiments, the code analyzer may only calculate and report the earliest time at which an address for a memory reference instruction could have been generated, and the actual calculation of the potential prefetch window may be performed elsewhere.

If the instruction is a register-modifying instruction (i.e., an instruction that loads a data value into a register of the execution engine 105) (as determined in decision block 525), the code analyzer may be configured to update the register timestamp for the register being modified. (It is noted that the same instruction may be a both a memory reference instruction for which a potential prefetch window is to be calculated, and a register modifying instruction for which a register timestamp is to be modified, in some embodiments.) In the embodiment depicted in FIG. 5, register-modifying instructions may be classified into four general categories (loads from memory, constant loads, conditional loads, and loads derived from arithmetic/logical operations on one or more source registers), and the register timestamps may be updated based on the category of the resister-modifying instruction. If the register-modifying instruction is a load from memory (i.e., is a value from a memory location is loaded into the register), as detected in decision block 530, the register timestamp for that register may be set to the instruction timestamp of the register-modifying instruction (i.e., to the "current" instruction timestamp) (block 535). Setting the register timestamp to the current instruction timestamp in this manner may indicate that the value loaded into the register could have been calculated no earlier at the execution engine than the current time. If the register-modifying instruction loads a constant (e.g., a value defined as a constant in the program of which the instruction stream forms a part, or a value from a "constant register" such as %g0 in some SPARC™ processors) into the register (block 540), the register timestamp may be set to zero (block 545), e.g., to indicate that a constant value could have been loaded at any time during the execution, since the constant value does not have a temporal dependency on any other computations. If the register-modifying instruction is a conditional move instruction based on the value of a condition code register (block 550), the register timestamp may be set to the current register timestamp of the condition code register (block 555), e.g., to indicate that as soon as the condition on which the load is based is evaluated, the register could have been modified. In the embodiment depicted in FIG. 5, if the register-modifying instruction does not belong to any of the above three categories (i.e., if it loads the register neither from memory, nor based on a condition code register, nor a constant), the data being loaded into the register must be derived from a source register or registers, e.g., based on an arithmetic, logical and/or shift operation. The term "source register" is used herein to indicate that the value in the registers is a source for the modified value stored in the modified register." The source register or registers may include the modified register itself, e.g., a value in a register R1 may be set to the sum of the existing value in R1 and the value in a register R2. If the data being loaded is derived from one or more source registers, the register timestamp may be set to the maximum of the current register timestamps among the source registers (block 560), indicating that the value loaded into the register could only have been calculated after all the values for the source registers involved were known. For example, if the register-modifying instruction loads the sum of the values of registers R1 and R2 into register R3, the register timestamp for R3 may be set to the higher timestamp among R1's and R2's register timestamps. If the register-modifying instruction loads the sum of the values of registers R1 and R2 into register R1, then the register timestamp for R1 may be set to the higher timestamp among R1's existing timestamp value and R2's timestamp value.

It is noted that if a register-modifying instruction modifies a value based on one or more constants and the value of one or more other registers, the register timestamp would be set to the maximum register timestamp among the other registers, since even though the constants were available for computing the modified value at any time, the modified value could not have been computed until the values in the other registers were also known. In effect, the register timestamp value for such a register modifying instruction may be calculated as the maximum of "0" (the timestamp value contribution of the constant or constants) and the maximum among the timestamp values for the other registers. For example, if the register-modifying instruction loads the sum of the value in registers R1 (with a register timestamp value TSR1), R2 (with a register timestamp value TSR2) and a constant N into register R3, the register timestamp value for R3 may be set to the maximum of (TSR1, TSR2 and 0), that is, to the higher timestamp among TSR1 and TSR2. It is noted that in other embodiments, additional types of register-modifying instructions may be implemented, and the register timestamp calculations for the other categories of register-modifying instructions may differ from those illustrated in FIG. 5.

If, after examining a particular instruction of the stream, additional instructions remain in the stream (as detected in decision block 570), the operations of blocks 510-560 of FIG. 5 may be repeated, until all the instructions have been examined and the potential prefetch windows for all the memory reference instructions have been calculated (block 575). It is noted that in other embodiments, some of the operations depicted in FIG. 5 may be performed in a different order than the order illustrated in FIG. 5: e.g., the checks to determine the type of register-modifying operation may be performed in a different order, the potential prefetch windows may be computed in parallel with or after the register timestamp values are updated, etc. In some embodiments where, for example, instructions other than register-modifying instructions may also determine when referenced addresses could have been generated, timestamps analogous to the register timestamps may also be maintained for the other types of instructions, and computations similar to those shown in FIG. 5 may be performed to compute the potential prefetch windows using the other timestamps.

The following brief example illustrates aspects of the operation of a code analyzer configured to maintain register timestamps as shown in FIG. 5, according to one embodiment. The following source code segment (written in the "C" programming language) comprises an example function called "addElementPair( )" in which contents of a pair of elements of a data array called "test" are added and stored into a result array called "result".

```
int test[256];
int result[256];
void addElementPair(void)
{
    int i;
    for (i = 0; i < (sizeof(test)/sizeof(test[0])); i++) {
        result[i] = test[test[i]] + test[i];
    }
}
```

Assembly code corresponding to the "for" loop in the above example, generated by a compiler for a processor implementing a version of the SPARC™ instruction set from Sun Microsystems is shown below for one embodiment. The instructions in the assembly code use a number of registers defined in the SPARC™ processor architecture. The registers are referred to in the code using the notation "%[register name]". For example "%g1" refers to a "global" register "g1", "%o2" refers to an "output" register "o2", etc. Initial values of the registers o2, o3, o4, o5, and the usage of global registers g1, g4 and g5 in terms of source code are provided in comment lines (indicated by the comment delimiter string "//") before the assembly instructions, and a brief comment on each line of compiled code is also provided.

```
// Initial values of "o" registers:
// %o2    -  &result[0] (address of result[0])
// %o3    -  &test[0] (address of test[0])
// %o4    -  255 (number of loop iterations left)
// %o5    -  0 (value of i * sizeof(int))
// Usage of "g" registers:
// %g1    -  test[i]
// %g4    -  test[i] * sizeof(int) (index used to access test[test[i]])
// %g5    -  test[test[i]] + test[i]
1:      lduw    [%o5+%o3], %g1   // load test[i] into %g1 ("1:" is a label)
        addcc   %o4, −1, %o4     // decrement loop count in %o4, set integer
                                 //     condition code
        sra     %g1, 0, %g4      // shift right instruction used to load
                                 //     test[i] from %g1 into %g4
        sllx    %g4, 2, %g4      // shift left instruction used to multiply
                                 //     contents of %g4 by the size of an
                                 //     integer
        lduw    [%o3+%g4], %g5   // load test[test[i]] into %g5
        add     %g5, %g1, %g5    // add %g5 and %g1 contents
        st      %g5, [%o5+%o2]   // store sum into result[i]
        bpos,pt %icc, 1b         // conditional branch back to label "1"
                                 //     if the integer condition code (icc)
                                 //     is positive; ",pt" is a hint to a branch
                                 //     predictor that the branch is likely to
                                 //     be taken, and "1b" indicates that the
                                 //     branch is a backwards branch to the
                                 //     label "1"
        add     %o5, 4, %o5      // generate next result array index - note that
                                 //     this instruction is executed
                                 //     before the preceding branch
                                 //     instruction is actually executed
                                 //     in a pipelined SPARC ™
                                 //     processor
```

For a given execution of the above instructions (i.e., an instruction stream 103 corresponding to the assembly code), code analyzer 110 may in one embodiment be configured to inspect each instruction executed, generating updated register timestamps for register-modifying instructions, earliest points in time at which addresses for memory references could have been generated, and potential prefetch windows. The calculations of the code analyzer for each instruction in a portion of an example instruction stream corresponding to one iteration of the "for" loop are shown below, in comment lines immediately below each listed instruction. Each instruction executed has been provided an instruction timestamp in the form of an instruction sequence number (arbitrarily starting at timestamp value "100"). Register timestamps are indicated by the notation "TS[register_name]". For memory reference instructions (e.g., load instructions such as "lduw" instructions and store instructions such as "st" instructions), the earliest point in time at which the referenced address could have been generated is indicated by the notation "EarliestAG", and the potential prefetch window is indicated by the notation "PPW".

```
// Initial register timestamps set to zero
// TS[o2] = 0; TS[o3] = 0; TS[o4] = 0; TS[o5] = 0; TS[g1] = 0; TS[g4] = 0; TS[g5] = 0
```

| Instruction Timestamp | Instruction And Corresponding Code Analyzer Calculations |
|---|---|
| 100 | `lduw    [%o5+%o3], %g1`<br>// EarliestAG = 0 (maximum of TS[o5] and TS[o3])<br>// PPW = (current instruction timestamp − EarliestAG) = 100 − 0 = 100<br>// TS[g1] = 100, since a value is loaded from memory |
| 101 | `addcc   %o4, −1, %o4`<br>// TS[o4] = 0 (arithmetic register modifying instruction based on<br>//           contents of o4 and a constant, and TS[o4] = 0) |
| 102 | `sra     %g1, 0, %g4`<br>// TS[g4] = 100 (logical register modifying instruction based on contents<br>//            of g1, and TS[g1] = 100 |
| 103 | `sllx    %g4, 2, %g4`<br>// TS[g4] = 100, since g4 is modified based on g4, and<br>//            TS[g4] = 100 |
| 104 | `lduw    [%o3+%g4], %g5`<br>// EarliestAG = 0 (maximum of TS[o4] and TS[o3])<br>// PPW = (current instruction timestamp − EarliestAG) = 104 − 0 = 104<br>// TS[g5] = 104, since a value is loaded from memory |
| 105 | `add     %g5, %g1, %g5`<br>// TS[g5] = maximum (TS[g5],TS[g1]) = maximum (104, 100) = 104 |

-continued

```
106           st         %g5, [%o5+%o2]
         // EarliestAG = 0 (maximum of TS[o5] and TS[o2])
         // PPW = (current instruction timestamp – EarliestAG) = 106 – 0 = 106
107           bpos,pt    %icc, 1b
         // Branch taken: Not a register modifying or memory reference instruction
108           add        %o5, 4, %o5
         // TS[o5] = 0 (arithmetic instruction based on o5, and TS[o5] = 0)
109           lduw       [%o5+%o3], %g1
         // EarliestAG = maximum of TS[o5] and TS[o3] = 0
         // PPW = (current instruction timestamp – EarliestAG) = 109 – 0 = 109
         // TS[g1] = 109, since a value is loaded from memory
```

It is noted that the potential prefetch window values in this example are strongly dependent on the arbitrarily chosen starting timestamp value of 100; for example, if the initial instruction timestamp were set to "1000" instead of "100", the PPW for the first instruction in the instruction sequence would have been calculated as 1000 instead of 100. In an actual instruction sequence analysis, of course, the instruction timestamps would not be arbitrary (e.g., they may start at zero), and potential prefetch window values would be calculated based on the real timestamps. In the above example of the code analyzer calculations, each of the load (lduw) instructions at instruction timestamps 100 and 104 appear to be good candidates for prefetch operations, since their operand addresses (which are based on constants in this example) could have been calculated early. It is noted that when prefetching data for these load instructions, it may be important to track the amount by which the array index is incremented, in order to generate useful prefetches. If the data is prefetched too early, for example, it may no longer be available (e.g., due to a cache replacement) when the memory reference instruction for which it was prefetched actually executes. In addition, if the data is prefetched too late, it may not help alleviate the problem it is intended to address. Additional logic may be needed to identify the optimal time (e.g., how many instructions ahead) at which the prefetch instruction(s) should be inserted in some embodiments. It is noted that loop unrolling (which may be implemented by an optimizing compiler) may hide some of these problems in some embodiments. Factors such as limits on the total number of outstanding prefetch operations in a particular processor architecture or implementation may also be used in determining when and if prefetch operations should be inserted into the executable code in some embodiments.

Figure 6:
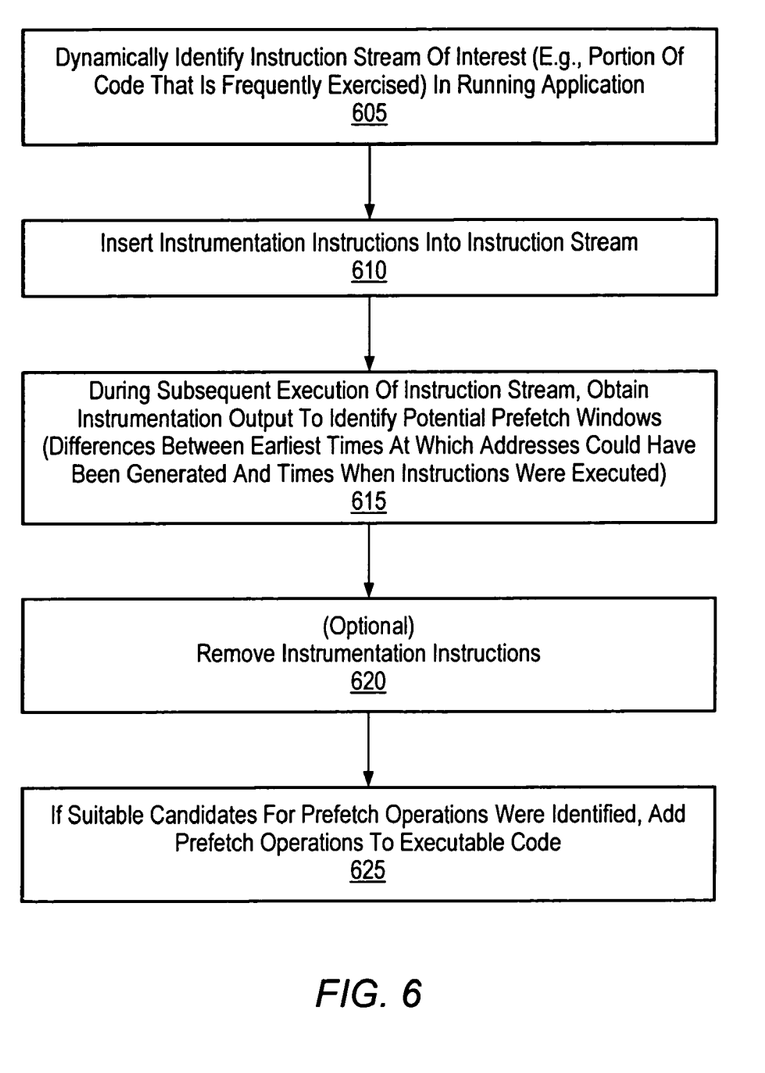
FIG. 6 is a flow diagram illustrating aspects of the operation of a code analyzer configured to dynamically instrument running executable code to obtain information required to identify potential prefetch opportunities, according to one embodiment.

FIG. 6 is a flow diagram illustrating aspects of the operation of a code analyzer 110 configured to dynamically instrument running executable code 102 to obtain information required to identify potential prefetch opportunities, according to one embodiment. The code analyzer 110 may be configured to identify instruction streams of interest, such as portions of frequently executed code, within a running application (block 605). For example, in one embodiment the code analyzer 110 may be used in conjunction with, or may form a subcomponent of, a JIT compiler in a JVM that is configured to generate native code for frequently executed portions of one or more applications. The code analyzer 110 may be configured to insert instrumentation code into the identified instruction stream (block 610), e.g., to generate the register timestamps described above in conjunction with the description of FIG. 5. During a subsequent execution of the instruction stream, the code analyzer may determine potential prefetch windows for various memory reference instructions in the instruction stream using the output of the instrumentation instructions (block 615). The instrumentation instructions may then be optionally removed from the running application code in some embodiments (block 620). If suitable candidates for prefetch operations were identified, prefetch instructions may be dynamically inserted at appropriate positions in the running executable code (block 625), e.g., in order to reduce effective memory latency during future executions of the instruction stream.

Figure 7:
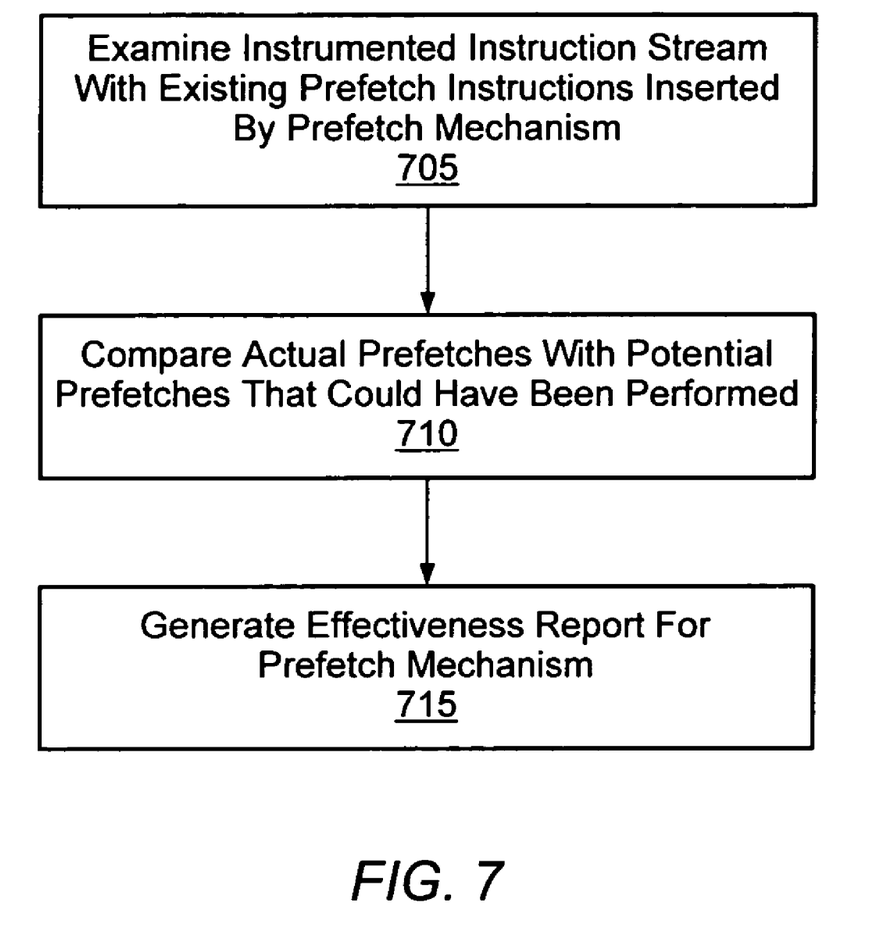
FIG. 7 is a flow diagram illustrating aspects of the operation of a code analyzer in one embodiment where an instruction stream containing existing prefetch instructions is analyzed to determine the effectiveness of a prefetch mechanism.

FIG. 7 is a flow diagram illustrating aspects of the operation of a code analyzer in one embodiment where an instruction stream containing existing prefetch instructions is analyzed to determine the effectiveness of a prefetch mechanism. The code analyzer 110 may be configured to examine an instrumented version of the instruction stream including the existing prefetch instructions (block 705). The actual prefetch operations performed may then be compared to the potential set of prefetch operations that could have been performed (block 710), where the potential set of prefetch operations may be determined using the calculations of prefetch windows described above. The calculation of prefetch windows for each memory reference instruction in the execution stream may provide an upper bound on the number of prefetch operations that could theoretically be performed, thus providing a benchmark against which the actual prefetch operations may be judged. In some embodiments, a report indicating the effectiveness of the prefetch mechanism in use may be generated by the code analyzer (block 715). In some embodiments, e.g., when a simulator or an emulator is being used for the analysis, the effectiveness of different prefetch mechanisms may be compared using the above techniques. For example, a simulation of a first prefetch instruction insertion mechanism may be run to insert a first set of prefetch instructions into the instruction stream, an additional simulation of a second prefetch instruction insertion mechanism may be run to insert a second set of prefetch instructions, and then the first and second sets of prefetch instructions may be compared against a best-case prefetch scenario generated using the register timestamp techniques described earlier.

As noted above, in some embodiments the execution engine may be an actual single processor or multiprocessor system, e.g., the executable code 102 may be run directly on target hardware and instrumented/analyzed while the code runs, while in other embodiments, the execution engine may be a simulation of a processor or computer system. In one implementation, the analysis may be performed using a tool similar to the Shade simulator tool, e.g., to simulate various versions of the SPARC™ instruction set from Sun Microsystems. Applications may be dynamically compiled and cached in such tools, and arbitrarily detailed state information may be collected during the simulation, e.g., using various types of logging techniques. For example, a data structure representing a "shadow" register corresponding to each actual register in a simulated processor implementation may be set up in one embodiment of a simulator tool such as Shade, and register timestamps may be stored in the shadow registers. Some simulation and trace tools may be configured to analyze instruction streams or traces at the basic block level (a basic block is a sequence of instructions without a branch instruction). When such tools are used for code analysis, register dependency information such as the register timestamp values described above may be preserved with each basic block, and the dependency information for different basic blocks may be merged when the basic blocks are chained (e.g., linked together by branch instructions) for analysis. By merging the register dependency information across basic blocks, longer potential prefetch windows may be determined in some embodiments than if the analysis was restricted to one basic block at a time.

Figure 8:
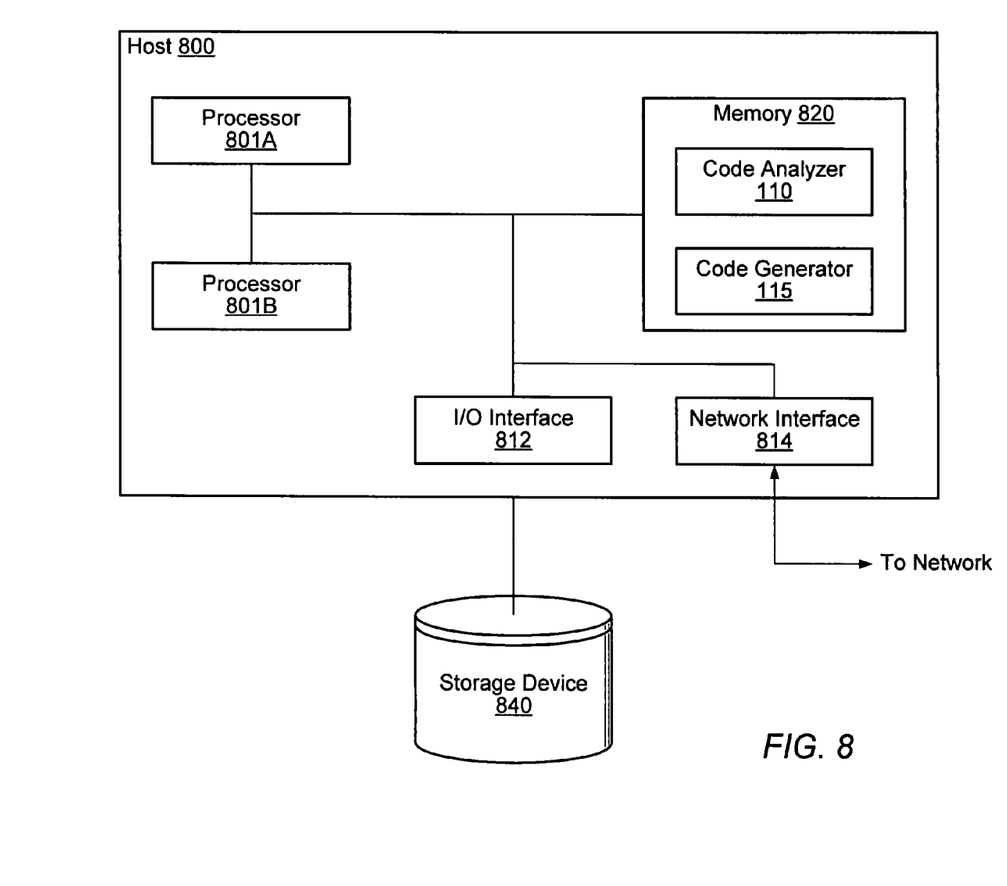
FIG. 8 is a block diagram of a computer host, according to one embodiment.

FIG. 8 is a block diagram of a computer host 800, according to one embodiment. The host 800 comprises one or more processors 801 coupled to a memory 820. In various embodiments, processors 801 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of code analyzer 110 and/or code generator 115 may be partly or fully resident within memory 820 at a given point in time, and may also be stored on a storage device 840. In various embodiments, the executable code 102 may comprise a portion or all of any type of individual or standalone application (e.g., a database application or a scientific simulation application), an instance or component of a distributed application, an application server configured to support a collection of deployed applications including J2EE™ (Java 2 Enterprise Edition) applications, etc. Memory 820 may be implemented using any appropriate medium such as any of various types of RAM (e.g., DRAM, SDRAM, RDRAM, SRAM, etc.). In addition to processors 801 and memory 820, host 800 may also include one or more I/O interfaces 812 providing access to storage devices 840, one or more network interfaces 814 providing access to a network, and the like. Any of a variety of storage devices may be used to store the instructions as well as data for code analyzer 110 and/or code generator 115 in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising: a processor; and memory coupled to the processor, wherein the memory comprises program instructions executable by the processor to implement a code analyzer configured to: analyze an instruction stream of compiled code executable at an execution engine to identify, for a given memory reference instruction in the stream that references data at a memory address calculated during an execution of the instruction stream, an earliest point in time during the execution at which sufficient data is available at the execution engine to calculate the memory address, wherein the memory address is calculated during the execution from values stored in one or more registers of the execution engine, wherein the instruction stream specifies an instruction timestamp for each of a plurality of instructions in the instruction stream, wherein said analyze comprises: for each register modifying instruction in the instruction stream that stores a value into a register of the one or more registers, update a register timestamp associated with the register to indicate the earliest instruction timestamp at which the value could have been computed during the execution of the instruction stream; and identify one or more specific registers whose values are used to calculate the memory address referenced by the given memory reference instruction; wherein the earliest point in time is indicated by the latest resister timestamp among the resister timestamps of the one or more specific resisters when the given memory reference instruction is executed; and generate an indication of whether the given memory reference instruction is suitable for a prefetch operation based on a difference in time between the earliest point in time and a time at which the given memory reference instruction is executed during the execution.

2. The system as recited in claim 1, wherein the code analyzer is further configured to: determine whether the given memory reference instruction is suitable for the prefetch operation, wherein said determining comprises: computing the difference in time between the earliest point in time and the time at which the given memory reference instruction is executed during the execution; and determining that the given memory reference is suitable for the prefetch operation if the difference in time exceeds a specified threshold.

3. The system as recited in claim 1, wherein the code analyzer is further configured to: select, as the instruction stream, a portion of a compiled executable version of an application program to be optimized for performance; and insert instrumentation code into the instruction stream to generate data to compute the earliest point in time; obtain the data to compute the earliest point in time from the instrumentation code during an execution of the instruction stream; and compute the earliest point in time using the data generated by the instrumentation code.

4. The system as recited in claim 1, wherein the indication comprises a measure of the difference in time, further comprising a prefetch code generator configured to: receive the indication from the code analyzer; identify, using the measure of the difference in time, a position within executable code corresponding to the instruction stream at which to insert an instruction to prefetch the data located at the memory address; and insert the instruction to prefetch the data at the position within the executable code.

5. The system as recited in claim 4, wherein the executable code is a portion of an executable version of an application targeted for execution in a virtual machine process, wherein the code generator is a just-in-time compiler included in the virtual machine process.

6. The system as recited in claim 1, wherein said updating the register timestamp comprises: if the register modifying instruction stores a constant into the register, setting the register timestamp to zero; if the register modifying instruction loads a data value from a memory location into the register, setting the register timestamp to the instruction timestamp of the register modifying instruction; if the register modifying instruction stores a result of an arithmetic or logical operation into the register, wherein operands of the arithmetic or logical operation were located in one or more source registers, setting the register timestamp to the maximum register timestamps among the register timestamps of the one or more source registers; and if the register modifying instruction is a conditional move instruction using a condition code register, setting the register timestamp to the register timestamp of the condition code register.

7. The system as recited in claim 1, wherein the execution engine comprises a simulator of a computer system.

8. The system as recited in claim 1, wherein the execution engine comprises a processor of a computer system.

9. The system as recited in claim 1, wherein the instruction stream comprises a plurality of memory reference instructions and one or more existing prefetch instructions inserted into the instruction stream by a prefetch instruction insertion mechanism, wherein the code analyzer is further configured to: determine a total number of memory reference instructions for which prefetch instructions could have been inserted in the instruction stream; determine an actual number of memory reference instructions for which prefetch instructions were inserted in the instruction stream by the prefetch instruction insertion mechanism; and generate an indication of an effectiveness of the prefetch instruction insertion mechanism, based at least in part on comparing the actual number with the total number.

10. A method, comprising: performing by a computer: analyzing an instruction stream of compiled code executable at an execution engine to identify, for a given memory reference instruction in the stream that references data at a memory address calculated during an execution of the instruction stream, an earliest point in time during the execution at which sufficient data is available at the execution engine to calculate the memory address, wherein the memory address is calculated during the execution from values stored in one or more registers of the execution engine, wherein the instruction stream specifies an instruction timestamp for each of a plurality of instructions in the instruction stream, wherein said analyzing comprises: for each register modifying instruction in the instruction stream that stores a value into a register of the one or more registers, updating a register timestamp associated with the register to indicate the earliest instruction timestamp at which the value could have been computed during the execution of the instruction stream; and identifying one or more specific registers whose values are used to calculate the memory address referenced by the given memory reference instruction; wherein the earliest point in time is indicated by the latest register timestamp among the register timestamps of the one or more specific registers when the given memory reference instruction is executed; and generating an indication of whether the given memory reference instruction is suitable for a prefetch operation based on a difference in time between the earliest point in time and a time at which the given memory reference instruction is executed during the execution.

11. The method as recited in claim 10, further comprising: determining whether the given memory reference instruction is suitable for the prefetch operation, wherein said determining comprises: computing the difference in time between the earliest point in time and the time at which the given memory reference instruction is executed during the execution; and determining that the given memory reference is suitable for the prefetch operation if the difference in time exceeds a specified threshold.

12. The method as recited in claim 10, further comprising: selecting, as the instruction stream, a portion of a compiled executable version of an application program to be optimized for performance; and inserting instrumentation code into the instruction stream to generate data to compute the earliest point in time; obtaining the data to compute the earliest point in time from the instrumentation code during an execution of the instruction stream; and computing the earliest point in time using the data generated by the instrumentation code.

13. The method as recited in claim 10, wherein the indication comprises a measure of the difference in time, further comprising: receiving the indication at a code generator; identifying, using the measure of the difference in time, a position within executable code corresponding to the instruction stream at which to insert an instruction to prefetch the data located at the memory address; and inserting the instruction to prefetch the data at the position within the executable code.

14. A tangible computer readable medium comprising program instructions, wherein the instructions are computer-executable to implement a code analyzer configured to: analyze an instruction stream of compiled code executable at an execution engine to identify, for a given memory reference instruction in the stream that references data at a memory address calculated during an execution of the instruction stream, an earliest point in time during the execution at which sufficient data is available at the execution engine to calculate the memory address, wherein the memory address is calculated during the execution from values stored in one or more resisters of the execution engine, wherein the instruction stream specifies an instruction timestamp for each of a plurality of instructions in the instruction stream, wherein said analyze comprises: for each resister modifying instruction in the instruction stream that stores a value into a resister of the one or more resisters, update a resister timestamp associated with the resister to indicate the earliest instruction timestamp at which the value could have been computed during the execution of the instruction stream; and identify one or more specific resisters whose values are used to calculate the memory address referenced by the given memory reference instruction; wherein the earliest point in time is indicated by the latest resister timestamp among the resister timestamps of the one or more specific resisters when the given memory reference instruction is executed; and generate an indication of whether the given memory reference instruction is suitable for a prefetch operation based on a difference in time between the earliest point in time and a time at which the given memory reference instruction is executed during the execution.

15. The computer readable medium as recited in claim 14, wherein the instructions are further computer-executable to: determine whether the given memory reference instruction is suitable for the prefetch operation, wherein said determining comprises: computing the difference in time between the earliest point in time and the time at which the given memory reference instruction is executed during the execution; and determining that the given memory reference is suitable for the prefetch operation if the difference in time exceeds a specified threshold.

16. The computer readable medium as recited in claim 14, wherein the instructions are further computer-executable to: select, as the instruction stream, a portion of a compiled executable version of an application program to be optimized for performance; and insert instrumentation code into the instruction stream to generate data to compute the earliest point in time; obtain the data to compute the earliest point in time from the instrumentation code during an execution of the instruction stream; and compute the earliest point in time using the data generated by the instrumentation code.

17. The computer readable medium as recited in claim 14, wherein the indication comprises a measure of the difference in time, wherein the instructions are further computer-executable to: receive the indication at a code generator; identify, using the measure of the difference in time, a position within executable code corresponding to the instruction stream at which to insert an instruction to prefetch the data located at the memory address; and insert the instruction to prefetch the data at the position within the executable code.

* * * * *